(12) United States Patent
 Dilts et al.

(10) Patent No.: US 11,096,327 B2
(45) Date of Patent: Aug. 24, 2021

(54) CROP RESIDUE SPREADER ROTOR WITH DIFFERENT PADDLE SHAPES

(71) Applicant: CNH Industrial America LLC, New Holland, PA (US)

(72) Inventors: Mark D. Dilts, New Holland, PA (US); Reinout De Baere, Maldegem (BE)

(73) Assignee: CNH Industrial America LLC, New Holland, PA (US)

( * ) Notice: Subject to any disclaimer, the term of this patent is extended or adjusted under 35 U.S.C. 154(b) by 113 days.

(21) Appl. No.: 16/349,123

(22) PCT Filed: Nov. 10, 2017

(86) PCT No.: PCT/US2017/061107
§ 371 (c)(1),
(2) Date: May 10, 2019

(87) PCT Pub. No.: WO2018/089796
PCT Pub. Date: May 17, 2018

(65) Prior Publication Data
US 2019/0269071 A1    Sep. 5, 2019

Related U.S. Application Data

(60) Provisional application No. 62/420,219, filed on Nov. 10, 2016.

(30) Foreign Application Priority Data

Dec. 22, 2016  (BE) .................................. 2016/5959

(51) Int. Cl.
*A01D 41/12*    (2006.01)
*A01F 12/30*    (2006.01)
*A01F 12/40*    (2006.01)

(52) U.S. Cl.
CPC .......... *A01D 41/1243* (2013.01); *A01F 12/30* (2013.01); *A01F 12/40* (2013.01)

(58) Field of Classification Search
CPC ..... A01D 41/1243; A01D 41/12; A01F 12/30; A01F 12/40; E01H 1/045; E01H 1/056;
(Continued)

(56) References Cited

U.S. PATENT DOCUMENTS 4,617,942 A   10/1986  Garner
6,238,286 B1   5/2001  Aubry et al.
(Continued)

FOREIGN PATENT DOCUMENTS

EP         2347645 A1     7/2011

OTHER PUBLICATIONS

Operator Manual of a Rauch MDS.

*Primary Examiner* — Thomas B Will
*Assistant Examiner* — Matthew Ian Neal
(74) *Attorney, Agent, or Firm* — Peter Zacharias; Patrick Sheldrake

(57) ABSTRACT

A crop residue spreader for an agricultural crop harvester such as a combine includes a rotor having a plurality of paddles including a first paddle having a first cross-sectional shape and a second paddle having a second cross-sectional shape, the second cross-sectional shape of the second paddle being different from the first cross-sectional shape of the first paddle. Different V-shapes can be used for the first and second cross-sectional shapes, the openings of the V-shapes facing in a forward rotational direction of the rotor. Multiple pairs of similarly shaped paddles can be used.

10 Claims, 7 Drawing Sheets

(58) Field of Classification Search
CPC ..... E01H 10/007; E01C 19/20; E01C 19/202;
E01C 19/203
USPC .......... 460/111, 112; 404/108; 414/503, 528;
239/659, 661
See application file for complete search history.

(56) References Cited

U.S. PATENT DOCUMENTS

| | | | |
|---|---|---|---|
| 7,473,171 B1* | 1/2009 | Schwinn | A01D 41/1243 460/111 |
| 7,927,200 B2* | 4/2011 | Van Overschelde | A01D 41/1243 460/112 |
| 8,146,336 B2* | 4/2012 | Weichholdt | A01D 41/1243 56/112 |
| 8,147,303 B2 | 4/2012 | Lauer et al. | |
| 8,801,513 B2* | 8/2014 | Ricketts | A01D 45/02 460/111 |
| 2007/0015556 A1 | 1/2007 | Johnson et al. | |
| 2009/0325659 A1* | 12/2009 | Overschelde | A01F 12/40 460/112 |
| 2010/0248802 A1 | 9/2010 | Lauer et al. | |
| 2014/0162739 A1* | 6/2014 | Isaac | A01F 12/30 460/111 |
| 2016/0374270 A1* | 12/2016 | Maes | A01D 41/1243 460/111 |
| 2017/0142900 A1* | 5/2017 | Mahieu | A01C 17/008 |

* cited by examiner

CROP RESIDUE SPREADER ROTOR WITH DIFFERENT PADDLE SHAPES

FIELD OF THE INVENTION

The present invention relates to agricultural harvesters such as combines, and, more particularly, to crop residue spreader systems used in such combines.

BACKGROUND OF THE INVENTION

An agricultural harvester known as a "combine" is historically termed such because it combines multiple harvesting functions, such as picking, threshing, separating and cleaning within a single harvesting unit. A combine includes a header which removes the crop from a field, and a feeder housing which transports the crop matter into a threshing section. In the threshing section, a threshing rotor rotates within a perforated housing, which may be in the form of adjustable concaves, and performs a threshing operation on the crop to separate the grain from other non-grain plant material. The threshed grain falls through perforations in the concaves and onto a grain pan. From the grain pan, the grain enters a cleaning system where agitation, airflow and screens are used to further clean the grain. The cleaned grain is then transported to a grain tank onboard the combine for temporary storage before it is offloaded to transport vehicles. As part of the cleaning system, a cleaning fan blows air through sieves to discharge straw, chaff and other debris toward the rear of the combine.

During the process of harvesting in a combine, the desired grain is gathered and saved while crop material other than the desired grain is expelled from the combine. The non-grain crop material or crop residue is usually derived from two areas in the combine, the threshing rotor and the cleaning system. The material expelled from the threshing rotor is generally referred to as straw and includes much of the larger plant material such as stalks, stems, cobs leaves and the like as well as foreign or non-crop material. The material expelled from the cleaning system is generally referred to as chaff and includes much of the finer plant material residue, such as pods, husk fragments and particulates. The combined flows of crop residue to be expelled from the combine can be dealt with in several ways; however, the processes for redepositing the residue material back into the field can be categorized generally as either windrowing or spreading.

In a windrowing process, the crop residue is deposited onto the harvested crop stubble in a continuous narrow stream or windrow, which is much narrower than the harvested swath width. Accumulated in this manner, the windrowed residue material can be picked up easily for baling or other subsequent processing or use.

In a spreading process, a mechanical device distributes the straw and/or chaff evenly across the extent of the combine header cutting width. The material to be spread is usually chopped to a short length so that after spreading the material will break down quickly to add nutrients to the soil and/or to be sufficiently small so as to not interfere with subsequent tilling or seeding operations.

Residue spreaders can be of horizontal and vertical types. A horizontal spreader includes a rotor driven on a generally vertical axis and a plurality of vanes or paddles on the rotor to propel residue in a wide swath behind the combine. The vanes or paddles are flat, or slightly curved. Commonly, two such rotors are used, rotating in opposite directions within a housing. After being chopped, the crop residues enter the rotor area through a vertical inlet in the spreader housing, and as the paddles rotate about the axis the residue slides along the paddles surfaces and is propelled towards a tangential outlet of the housing. It is known to use adjustable structures of the housing and outlet to control the outlet flow of material, by adjusting the size and position of the outlet and of the space between the rotor paddles and the adjustable structures, to achieve a substantially even distribution of the crop residue material across the width of a distribution swath behind the combine. It is desirable to achieve an even distribution of material for more even and consistent residue material breakdown and to facilitate subsequent field tilling and seeding operations.

A vertical spreader includes a rotor driven on a generally horizontal axis and a plurality of vanes or paddles on the rotor to propel residue from the spreader housing. Again, commonly two such rotors are used, rotating in opposite directions.

One of the problems encountered with prior art spreaders is that the physical characteristics of the crop residue material can change due to many things, including the type of crop being harvested, the maturity of the crop, the moisture content of the crop material including surface wetness from atmospheric conditions, the volume of material being processed and the like. The surfaces of the equipment also can change from the accumulation of moisture, dust and dirt. As these or other conditions change, the distribution pattern from the spreader also can change due to the changing interaction of the rotor paddles with the crop residue material. For example, when the residue material is wet or heavy it will react differently with the paddles than when the material is light and dry, and both of these conditions can be presented at different times in the same day of harvesting. During wetter conditions, dust and chaff can become sticky so that the residue material accumulates at high positions on the paddles than under drier conditions when the material slides easily along the paddles to lower positions before being flung from the paddles at the outlet. Material heaviness, crop density, residue material make-up and other factors can influence the rate at which the residue material moves along the paddle surfaces. Under one condition, most of the residue material may remain near the tops of the paddles, and under another condition most of the residue material may quickly migrate to near the bottoms of the paddles before being flung from the paddles at the outlet. Vastly different trajectory patterns can result.

The changes described above can occur quickly and frequently in changing weather, field and crop conditions. While adjustments of the adjustable structures of the housing and outlet can achieve a more even distribution when the conditions change, such adjustments can be time-consuming and can require that the operator stop the harvesting operation to make the adjustments. As a result, operators sometimes continue the harvesting operation without adjusting the spreader, either because they are unaware that spreading conditions and performance have changed, or because the operator does not want to stop harvesting to make the necessary adjustments. In either case, the result can be uneven material distribution in the field.

Accordingly, what is needed in the art is an efficient crop residue spreader that minimizes variations in the distribution pattern of the spread material even as harvesting and crop material conditions change.

SUMMARY OF THE INVENTION

The present invention provides a crop residue spreader with a rotor having paddles that distribute crop residue more evenly under a variety of differing crop and harvesting conditions.

In one form thereof, the crop residue spreader has a rotor with a plurality of paddles, including paddles of a cross-sectional V-shape, so that the paddles capture and operate against the crop material more consistently and more effectively.

In another form thereof, the crop residue spreader has a rotor with paddles of different cross-sectional V-shapes, so that different paddles each receive and operate against volumes of material as crop and harvesting conditions change, to thereby achieve more consistent spread material distribution.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
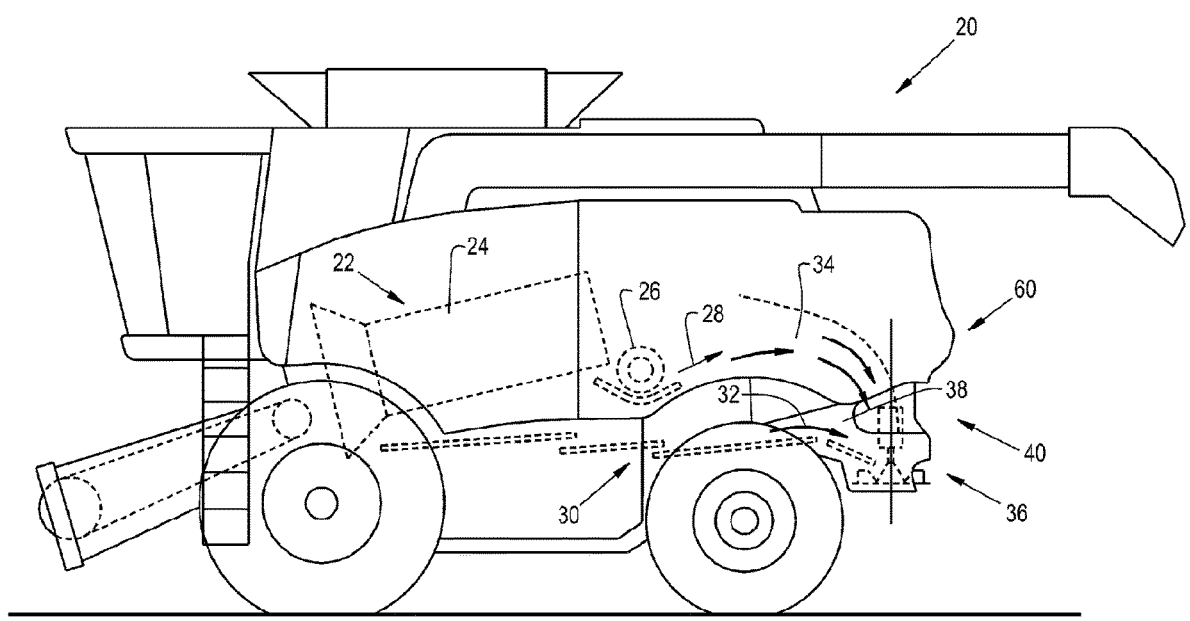
FIG. 1 is a simplified side elevational view of an agricultural harvesting machine in the form of a combine which may include a crop residue spreader having a rotor with paddles of multiple different shapes as disclosed herein.

Referring now to the drawings more specifically FIG. 1 shows an agricultural combine 20 which is representative of a wide variety of agricultural harvesting machines. Combine 20 includes a threshing system 22 having a threshing rotor 24 rotatable in known manner for separating the desirable crop component or grain from straw, stocks and other plant residue. A beater or chopper 26 is rotatable for propelling or directing a flow or stream of the plant residue, generally referred to as straw 28, toward the rear of combine 20. When configured as a chopper 26, straw and other large material is reduced in size. A cleaning system 30 receives the threshed crop component from threshing system 22 and removes chaff and other remaining residue such as seedpods, husks and the like, generally referred to as chaff 32, and directs a flow or stream of chaff 32 toward the aft end of combine 20. Straw 28 and chaff 32 pass through a cavity 34 toward a horizontal spreader assembly 36 at a lower opening 38 of cavity 34. Horizontal spreader assembly 36 is part of a crop residue spreader 40 having a rotor and paddles as to be described herein.

Figure 2:
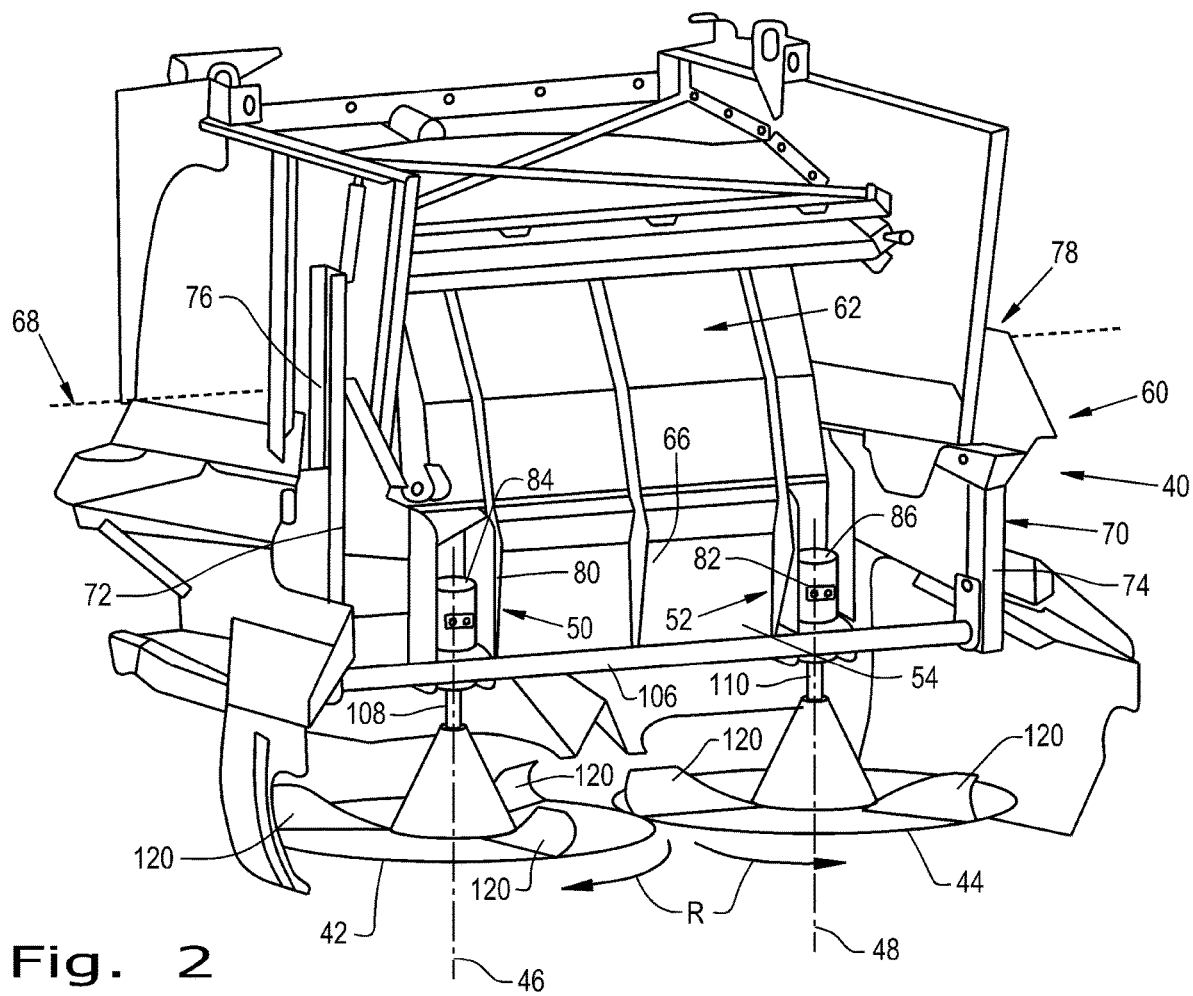
FIG. 2 is a fragmentary perspective view of an aft portion of the harvesting machine shown in FIG. 1.
Figure 3:
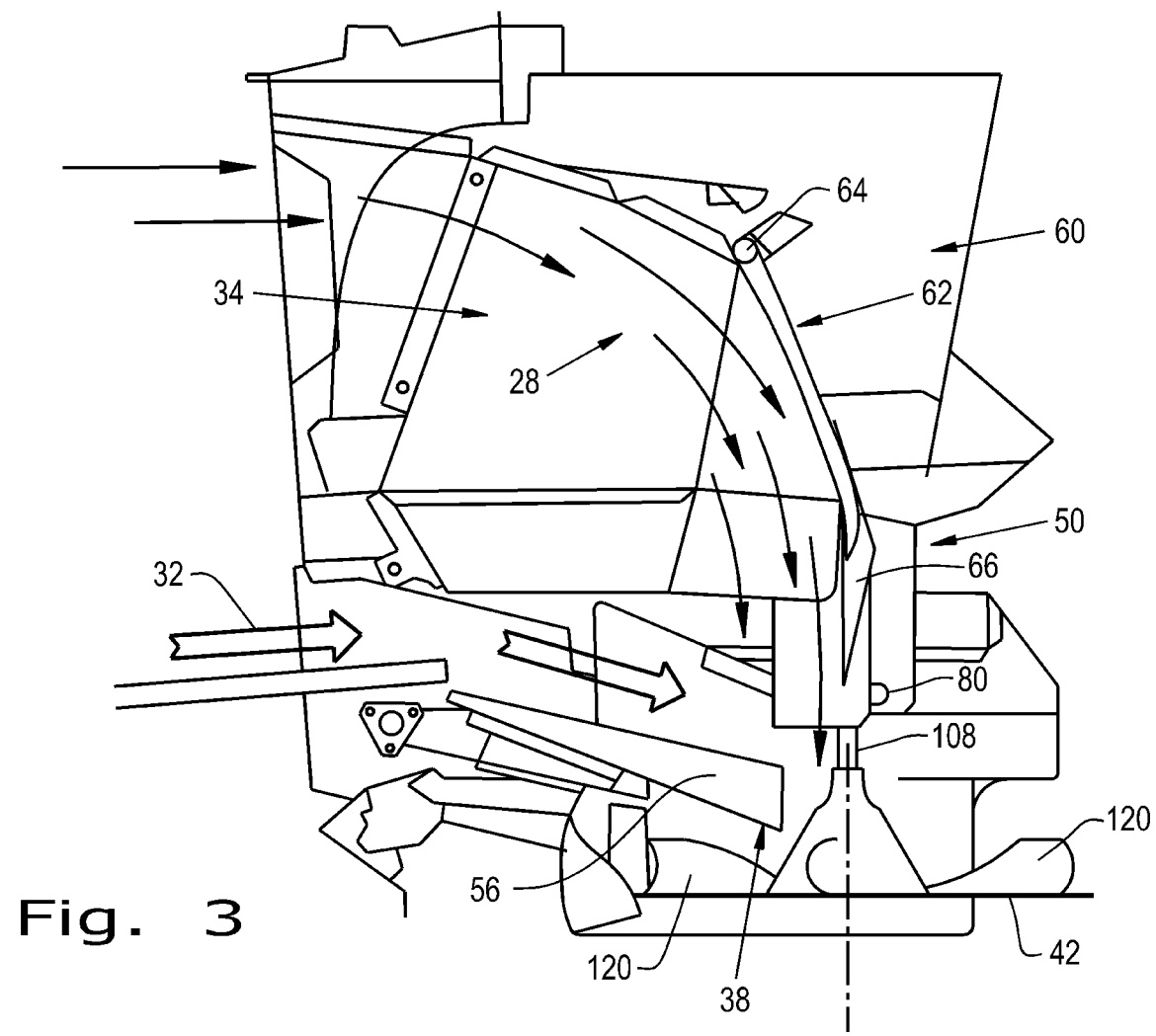
FIG. 3 is a fragmentary side elevational view of the harvesting machine shown in FIGS. 1 & 2.
Figure 4:
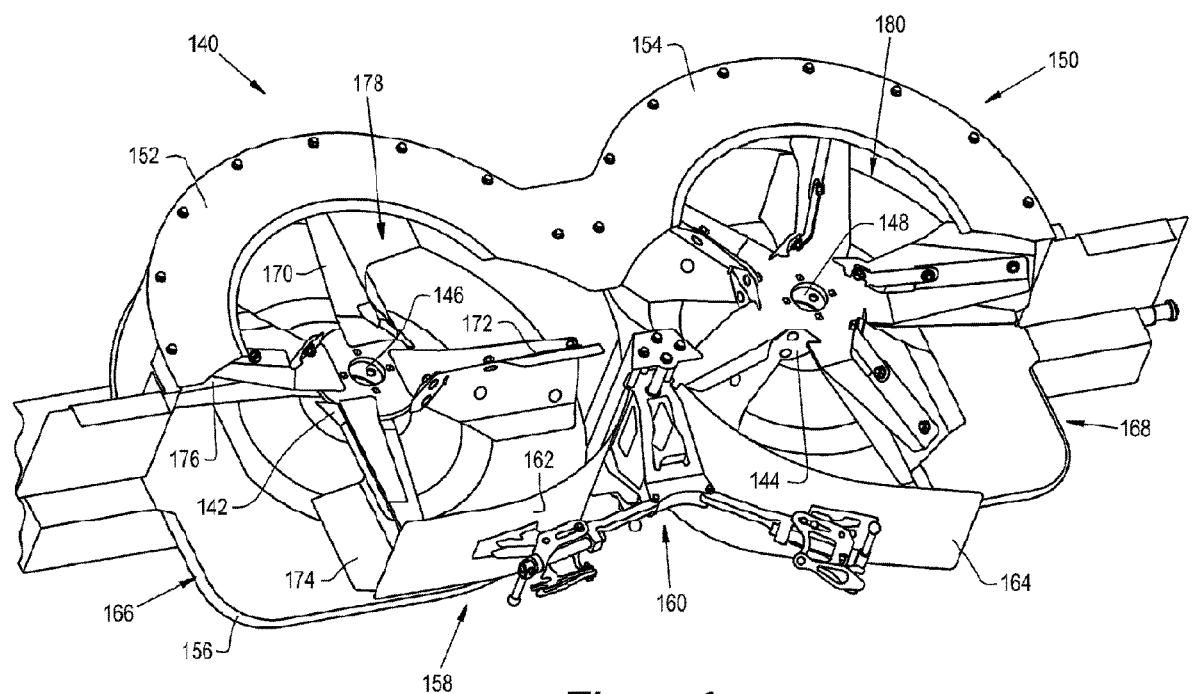
FIG. 4 is an enlarged perspective view of a crop residue spreader having a spreading rotor with paddles as disclosed herein.

Referring now also to FIGS. 2, 3 & 4 horizontal spreader assembly 36 of apparatus and system 40 includes side by side first and second spreader discs or rotors 42, 44 supported for counter rotation as indicated by arrows R, about generally upstanding rotational axes 46, 48, respectively. Spreader discs or rotors 42, 44 are supported and driven in rotations R by upstanding first and second spreader drive units 50, 52 positioned above the spreader discs or rotors 42, 44, respectively. An open area or space 54 is defined between the laterally positioned spreader drive units 50, 52. A chaff transfer pan 56 can be used for carrying some of the flow of chaff 32 toward the spreader assembly 36.

At an aft end 60 of combine 20, crop residue spreader 40 also can include a pivotally supported deflector door 62 that is pivotal about an axis 64 to adjustably position a lower portion 66 of deflector door 62 in relation to open area 54 defined between drive units 50, 52 of spreader assembly 36. Spreader assembly 36 can be supported for pivotal movement about an axis 68 between a lower, operable position as shown in the drawings for receiving the flows of straw 28 and chaff 32 for spreading thereof on a field, and an upward or stored position (not shown) in which the spreader assembly can be stowed when not in use for spreading. Accordingly, crop residue spreader 40 further includes a frame 70 and first and second pivot arms 72, 74 movable about first and second pivot points 76, 78, respectively, located on opposite sides of combine 20 along pivot axis 68, the arms 72, 74 also being connected to one another by a cross bar 106.

First and second drive units 50, 52 can include upstanding shields 80, 82 protecting first and second drive motors 84, 86 of drive units 50, 52, respectively. Drive motors 84, 86 are drivingly connected to first and second spreader discs or rotors 42, 44 by first and second drive shafts 108, 110, respectively.

As shown in FIGS. 1-3, each of the counter rotating spreader discs or rotors 42, 44 includes a plurality of structures to receive and engage straw 28 and chaff 32 to forcefully expel the straw 28 and chaff 32 from crop residue spreader 40. In FIGS. 1-3, the structures are indicated generically by pluralities of paddles 120, which should be understood to include paddles of different paddle shapes, as will be described with respect to FIGS. 4-6.

Referring now particularly to FIG. 4, a horizontal crop residue spreader 140 is shown. First and second spreader discs or rotors 142, 144 are rotatable about first and second rotational axes 146, 148, respectively. A spreader housing 150 includes fixed housing portions 152, 154 surrounding substantially half of the peripheries of spreader discs or rotors 142, 144, respectively, and a housing bottom 156 extends fully beneath spreader discs or rotors 142, 144.

A material deflector 158 is mounted between first and second spreader discs or rotors 142, 144 and includes an adjustment system 160 operating deflector plates 162, 164, respectively. Deflector plates 162, 164 are operatively associated with fixed housing portions 152, 154, but can be elevated from the positions shown in FIG. 4 to allow residue material such as straw 28 and chaff 32 to flow there beneath generally at the center rear of the combine. In the lowered positions shown in FIG. 4, deflector plates 162, 164 surround yet further portions of the peripheries of spreader discs or rotors 142, 144. Adjustment system 160 can be operated also in a manner to move deflector plates closer to or farther from the outer edges of spreader discs or rotors 142, 144. Together spreader housing 150 and deflector plates 162, 164 define tangential outlets areas 166, 168 for each of first and second spreader discs or rotors 142, 144, respectively. Vertical and horizontal adjustment of deflector plates 162, 164 can adjust the manner in which residue material is thrown from crop residue spreader 140. Thus, distribution can be directed more centrally by elevating deflector plates 162, 164 and the side distance for throwing the residue material can be altered by horizontal adjustment of deflector plates 162, 164. The use and operation of material deflector 158 is known to those skilled in the art and will not be described in further detail herein.

Each of the first and second spreader discs or rotors 142, 144 includes a plurality of impellers or paddles for engaging the residue material and accelerating the material to be thrown off the ends of the paddles as the paddles pass the open areas defined by tangential outlet areas 166, 168 and/or openings beneath deflector plates 162, 164 resulting from the elevation of the deflector plates. Generally, the paddles have somewhat V-shaped cross sectional shapes from top to bottom, with the opening of the V-shape facing in the forward rotation direction. The crop refuse including straw 28 and chaff 32 enters at the open top of housing 150 and migrates along the paddles to accumulate in the depth of the V-shape on each paddle. When optimized with the adjustment of material deflector 158 for the machine operating conditions, weather conditions and crop conditions a substantially even spread distribution can be obtained across the entire spreading width.

Figure 7:
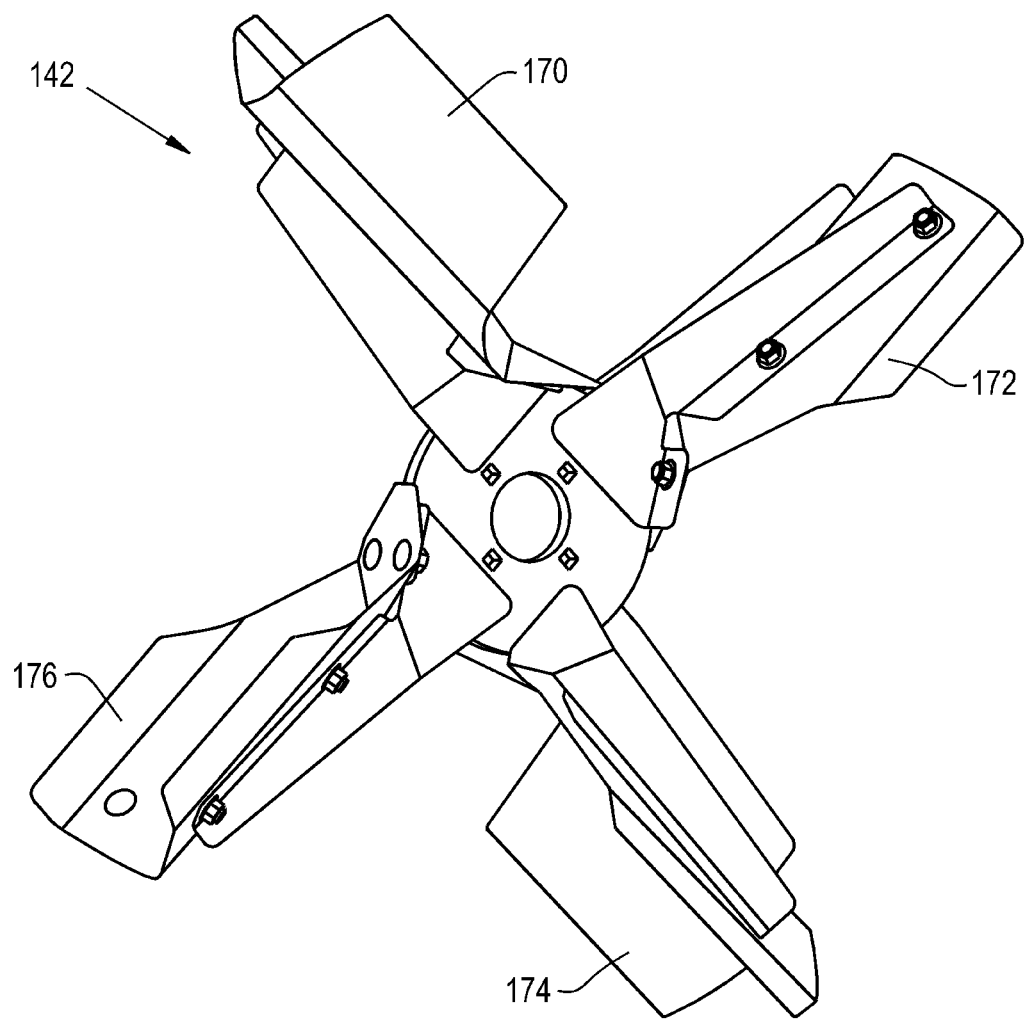
FIG. 7 is a perspective view of the rotor and paddles shown in FIGS. 4-6.

In the exemplary embodiment shown in FIGS. 4 & 7, first spreader disc or rotor 142 includes a first paddle 170 of a first cross-sectional shape, a second paddle 172 of a second cross sectional shape, a third paddle 174 of a third cross-sectional shape and a fourth paddle 176 similar to second paddle 172 and having the same cross-sectional shape as second paddle 172. Paddles 170, 172, 174 and 176 receive a flow of crop residue, including straw 28 and chaff 32 from a crop residue inlet 178 above the paddles and generally bounded by spreader housing 150 and material deflector 158. A similar residue inlet 180 is defined above second spreader disc or rotor 144.

Figure 5:
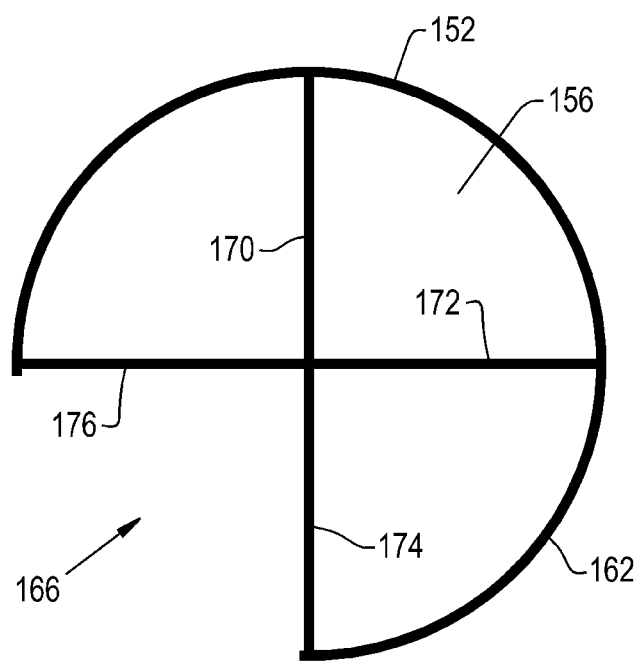
FIG. 5 is a schematic representation of a fragmentary portion of the crop residue spreader shown in FIG. 4.
Figure 6:
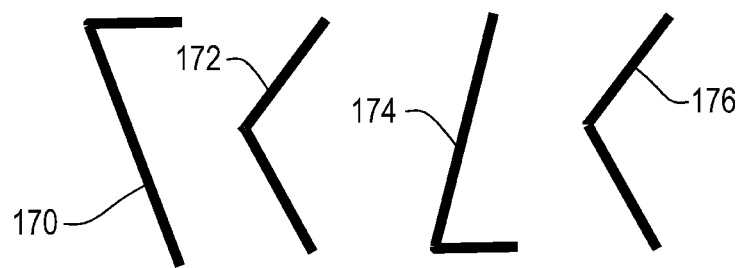
FIG. 6 is a schematic illustration of the cross-sectional shapes of the paddles of the spreading rotor shown in FIGS. 4 & 5.

To better illustrate the vertical cross-sectional shapes of first paddle 170, second paddle 172, third paddle 174 and fourth paddle 176, schematic representations thereof are shown in FIGS. 5 & 6. As can be seen, first paddle 170 has the depth of the V-shape thereof near the top of the paddle, and crop residue material such as straw 28 and chaff 32 received through residue inlet 178 and engaged by first paddle 170 will tend to remain near or migrate quickly toward the depth of the V-shape near the upper edge of the paddle. Second paddle 172 and fourth paddle 176 each have similar cross-sectional shapes, with the depths of the V-shapes thereof near the center of the paddles from top to bottom. Accordingly, residue material such as straw 28 and chaff 32 received through residue inlet 178 and engaged by second paddle 172 or fourth paddle 176 will tend to migrate quickly toward and remain near the depth of the V-shape near the center of the paddle from top to bottom. Third paddle 174 has the depth of the V-shape thereof near the bottom edge of the paddle. Residue material such as straw 28 and chaff 32 received through residue inlet 178 and engaged by third paddle 174 will migrate quickly toward and remain near the depth of the V-shape near the bottom of the paddle, near housing bottom 156.

Providing paddles having relatively aggressive V-shapes encourages more rapid material migration along the surface of the paddle toward the depth of the V-shape even as the various conditions change. Each paddle reacts with the residue material more consistently even when crop, harvesting, atmospheric or other conditions change. As a result, trajectory patterns for the residue material flung from the outlet remain more consistent even as the various conditions change.

Figure 8:
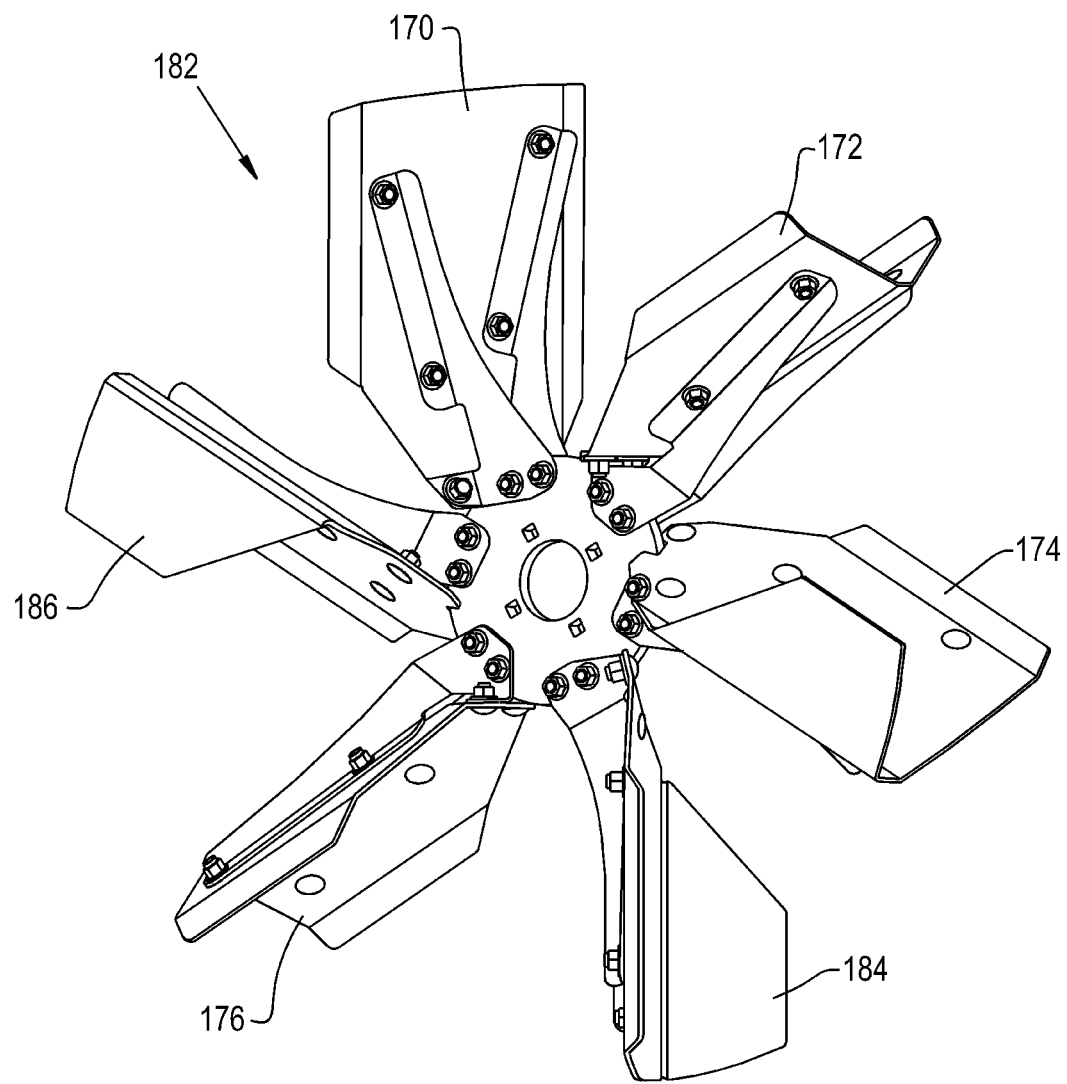
FIG. 8 is a perspective view of another embodiment of a rotor with multiple paddle shapes.

While the exemplary embodiment shown and explained with respect to FIGS. 4-7 includes four paddles and three different pattern shapes, it should be understood that more or fewer paddles also can be used. For example, 3 paddles can be used, one of each of the described shapes. Further, more than four paddles can be used with two paddles of each of two shapes and a fifth paddle of the remaining shape. Still further, six or more paddles can be provided with two paddles of each of three different shapes. FIG. 8 illustrates a rotor 182 similar to that shown in FIG. 7, but having three pairs of rotors, the two rotors within a pair being similarly shaped, but each pair differently shaped from the other pairs. Accordingly, rotor 182 includes a first paddle 170, a second paddle 172, a third paddle 174, and a fourth paddle 176 shaped similarly to the similarly numbered paddles described previously herein. Rotor 182 further includes a fifth paddle 184 shaped similarly to first paddle 170 and a sixth paddle 186 shaped similarly to third paddle 174. The similarly shaped paddles of a pair are positioned diametrically opposite one another to facilitate balance.

It should also be understood that more than three paddle shapes also can be used. For example, paddles having V-shapes with the depths thereof located between the shapes shown for the described embodiment also can be used. Five paddles can be used with three paddles of the first, second and third shapes, a fourth paddle between the first and second shape and a fifth paddle between the second and third shapes. Rotor 144 (FIG. 4) is depicted with five paddles, which may be five differently shaped paddles as just described, or may include one or two pairs of similarly shaped paddles. Still further variations and combinations can be provided. For further example, advantages can be obtained using paddles of two different V-shapes to encourage material positioning in at least two height positions relative to the paddles. Still further, while first spreader disc or rotor 142 is shown and described with paddles of multiple V-shape cross sections, it should be understood that second spreader disc or rotor 144 also can be provided with a plurality of paddles including paddles with different cross-sectional shapes either the same as or different from the cross-sectional shapes of paddles described previously, and with more paddles than rotor 142 as shown, or with the same number of paddles or fewer paddles than rotor 142. One or both rotors 142, 144 can be provided with multiple paddles of a single cross-sectional V-shaped configuration and still provide advantages by achieving more consistent material location in the depths of the V-shapes even as crop, harvesting, atmospheric and/or other conditions change.

While the exemplary embodiments shown and described have included rotors enclosed within housings, it should be understood that rotors with different paddle shapes as disclosed herein can be used advantageously also in more open arrangements without housings, which may include shrouds for guiding material, for example. Further, while a material inlet adjacent the rotor vertical axis has been shown and described, it should be understood that rotors with different paddle shapes as disclosed herein can be used advantageously in residue spreaders having residue inlets located in other positions relative to the rotor.

The invention claimed is:

1. A spreader disc for an agricultural combine, the spreader disc comprising:
   at least three radially extending paddles each having a different V-shape relative to the others, the at least three radially extending paddles for moving crop residue;
   wherein the spreader disc has a rotational axis.

2. The spreader disc of claim 1, wherein the at least three radially extending paddles are five radially extending paddles, each having a different V-shape.

3. The spreader disc of claim 2, wherein the V-shapes of each radially extending paddle has an opening facing in a forward rotational direction of the rotor.

4. The spreader disc of claim 1, wherein the V-shapes of each radially extending paddle has an opening facing in a forward rotational direction of the rotor.

5. A crop residue spreader for an agricultural crop harvester, the crop residue spreader comprising:
   a first rotor mounted for rotary movement about a vertical axis, the rotor comprising a plurality of radially extending paddles for moving crop residue, the plurality of radially extending paddles each having a different V-shape relative to the others;
   and
   a housing at least partly surrounding the rotor and having a tangential outlet and an inlet for residue adjacent the vertical axis.

6. The crop residue spreader of claim 5, wherein the plurality of paddles include at least five paddles each having a different V-shape.

7. The crop residue spreader of claim 6, further comprising a second rotor comprising a second plurality of radially extending paddles for moving crop residue, the second plurality of radially extending paddles including paddles shaped similarly to the first rotor.

8. The crop residue spreader of claim 5, wherein the V-shapes of each radially extending paddle has an opening facing in a forward rotational direction of the rotor.

9. The crop residue spreader of claim 5, further comprising an adjustable material deflector adjustably associated with the tangential outlet.

10. The crop residue spreader of claim 9, the adjustable material deflector comprising a deflector plate horizontally or vertically adjustable relative to the rotor.

* * * * *